O. F. GAMBATI.
COMBINED HEATER AND FILTER.
APPLICATION FILED JUNE 6, 1910.
984,757.
Patented Feb. 21, 1911.
2 SHEETS—SHEET 1.
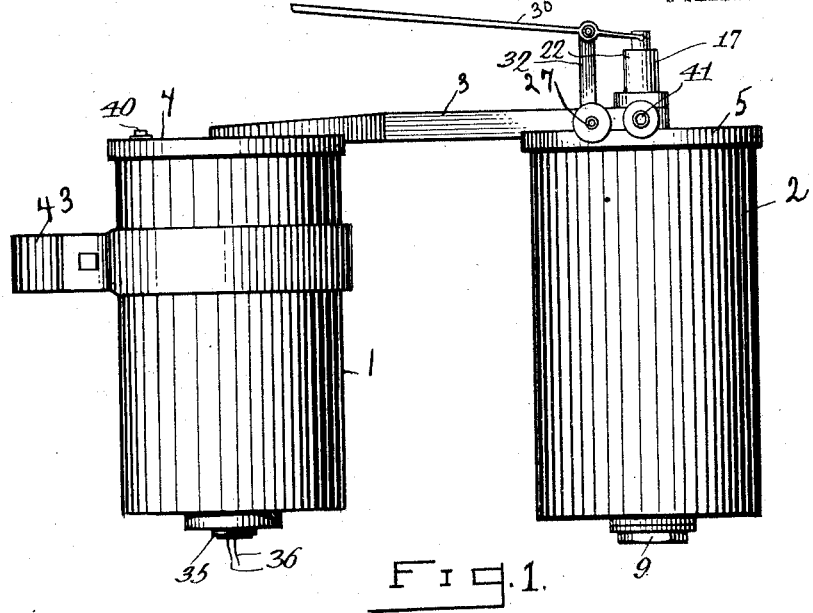
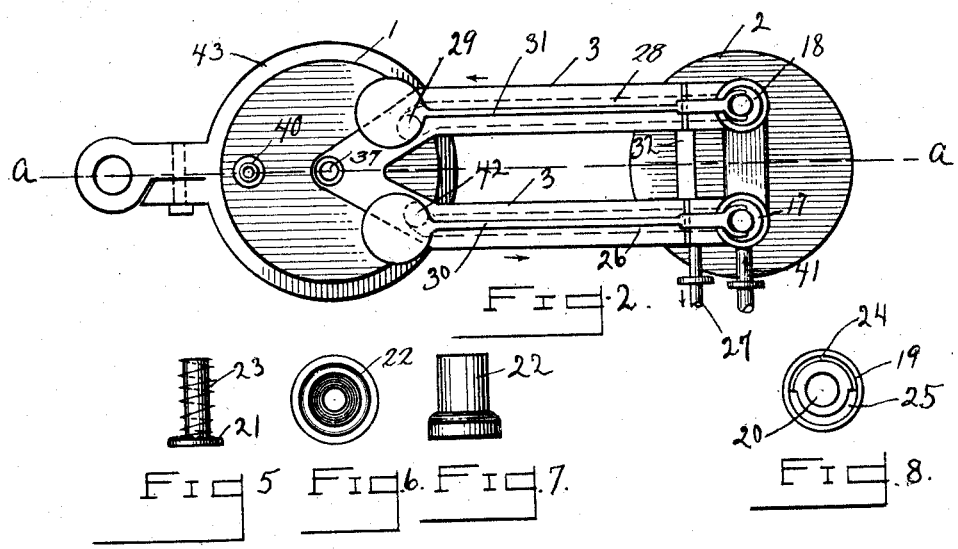
WITNESSES:
H. S. Barker
A. Tompkins
INVENTOR
Olympio F. Gambati.
BY
Hardway & Bathey
ATTORNEY

O. F. GAMBATI.
COMBINED HEATER AND FILTER.
APPLICATION FILED JUNE 6, 1910.

984,757.

Patented Feb. 21, 1911.
2 SHEETS—SHEET 2.

WITNESSES:
H. S. Barker
A. Tompkins

INVENTOR
Olympio F. Gambati.
BY
Hardway & Cathey
ATTORNEY

UNITED STATES PATENT OFFICE.

OLYMPIO F. GAMBATI, OF HOUSTON, TEXAS.

COMBINED HEATER AND FILTER.

984,757.  Specification of Letters Patent.  Patented Feb. 21, 1911.

Application filed June 6, 1910. Serial No. 565,353.

*To all whom it may concern:*

Be it known that I, OLYMPIO F. GAMBATI, a citizen of the United States, residing at Houston, in the county of Harris and State of Texas, have invented certain new and useful Improvements in a Combined Heater and Filter, of which the following is a specification.

My invention relates to new and useful improvements in a combined heater and filter.

The object of the invention is to provide a device of the character described which is specifically designed to be attached to a dentist's chair, and through which the water may pass from the water supply pipe and be discharged perfectly filtered and either hot or cold as may be desired. The device may also be attached to the ordinary water supply pipe and may be used wherever hot or cold water may be required.

With the above and other objects in view my invention has particular relation to certain novel features of construction and operation an example of which is given in this specification and illustrated in the accompanying drawings wherein:—

Figure 4:
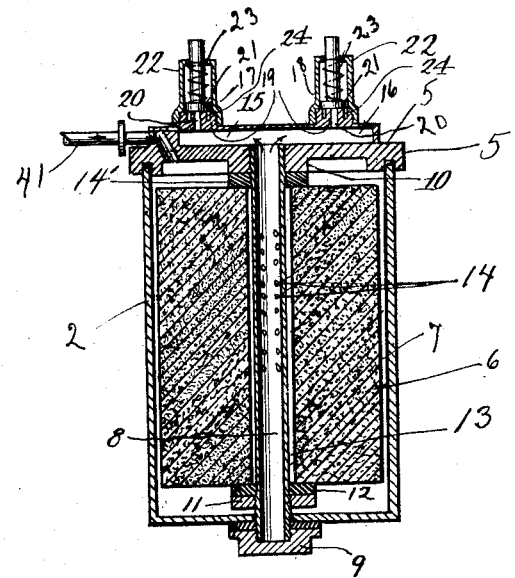
Figure 3:
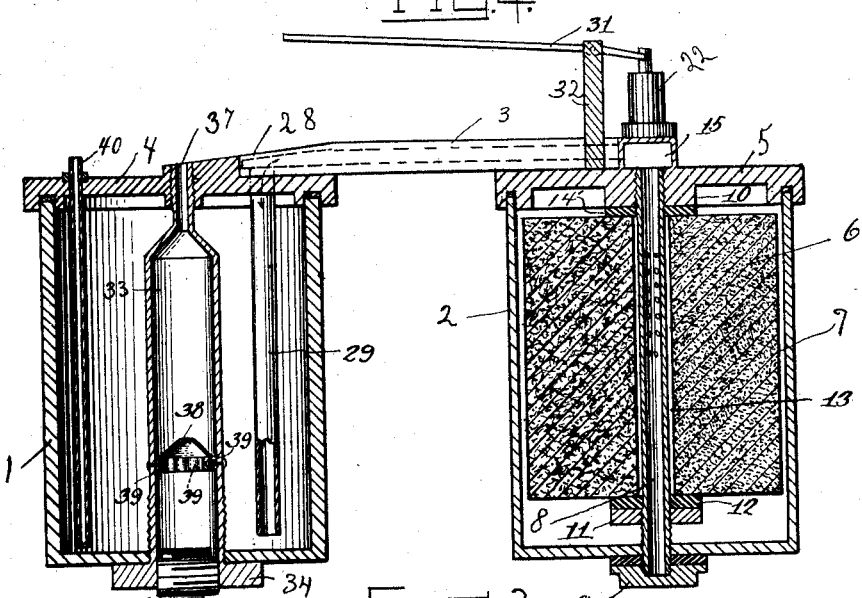

Figure 1 is a side elevation of my complete device. Fig. 2 is a plan view thereof. Fig. 3 is a sectional side elevation thereof taken on the line $a$—$a$ of Fig. 2. Fig. 4 is a sectional elevation of the filter. Fig. 5 is a detail view in elevation of the valve. Fig. 6 is a bottom plan view of the valve casing. Fig. 7 is a side elevation of the valve casing. Fig. 8 is a plan view of the valve seat.

Referring now more particularly to the drawings, wherein like numerals of reference designate similar parts in each of the figures, the numeral 1 refers to the heater casing which is connected to a similar filter casing 2 by means of the bridge 3. These casings are preferably cylindrical in shape and are of cast metal and have suitable bottoms cast integral therewith and have top members designated respectively by the numerals 4, 5, which are detachable and cast integral with the bridge 3.

The casing 2, contains a suitable filter 6, which is somewhat smaller in diameter than its casing so as to provide a water-chamber 7 therearound, and is secured in place by means of tube 8 which extends upwardly therethrough. The lower end of this tube is exteriorly threaded to receive the interiorly threaded nut 9 which is designed to rest closely against the casing bottom and the upper end thereof is exteriorly threaded and screws into the boss 10 projecting downwardly from the center of the top member 5, and thus secures the top 5 on the filter casing. The tube 8 has a washer 11 fixed thereon within the bottom of the casing and interposed between this washer and the filter is a rubber gasket 12 provided to make the joint between the washer and filter water tight. The tube 8 passes up through the filter loosely so as to provide a water chamber 13 around said tube and interposed between the filter and the top member 5 is a rubber gasket 14' which surrounds the tube and closes the chamber 13. The interior of this tube communicates with chamber 13 through perforations 14 through which the water passes to the interior of this tube, and the tube interior communicates with water passage ways 15, and 16, controlled respectively, by the valves 17 and 18, whose structure is presently to be described.

The numeral 19 refers to the valve seat which is cast integral with the bridge member 3 and is provided with a central opening 20. A valve 21 is disposed above the opening and is secured in position by means of the valve casing 22 which fits over the valve and seat and is screwed on the seat as shown in Fig. 4. The valve is normally held closed by means of a coil spring 23, which operates in resistance to the casing and valve.

The upper face of the valve seat is provided with an arcuate groove 24 opposing which is an arcuate downwardly extending passageway 25 through which the water from passage way 20 may pass from valve 17 into passage way 26 shown in dotted lines in Fig. 2, and thence into discharge pipe 27. The water from valve 18 passes through passage way 28 and thence into pipe 29 which discharges near the bottom of the heating chamber of casing 1. The valves 17, and 18 may be opened by means of their respective thumb levers 30, and 31, fulcrumed on the stand 32 and having engagement with the valve stems as shown in Figs. 1, 2, and 3.

The numeral 33 refers to a heating tube which extends upwardly through the heating chamber and whose upper end is reduced and has threaded engagement with the top 4 thereof. The lower end of this tube carries a circular flange 34 which seats against the chamber bottom and the tube is screwed into said bottom and forms a water tight joint therewith. This tube is designed to carry an electric heater 35 of any desirable type, which is provided with the usual connecting wires 36. These wires have a suitable connection with a generator (not shown). A gas burner may be used in lieu of the heater if it is so desired, and an open passage way 37 is provided to permit the escape of the fumes in case this character of burner is used. A deflector 38 is secured within tube 33 with passageways 39 around its outer edge and is designed to deflect the heat toward the walls of the tubes and thus elevate the temperature thereof.

The numeral 40, refers to a tube which extends from the top 4, down into the water chamber and has its lower end closed. This tube is designed to receive a suitable thermometer designed to indicate the temperature of the water within the chamber. Water is introduced into the filter chamber through inlet pipe 41 and after being filtered enters tube 8, through the perforation 14 and passes thence to passage ways 15 and 16. In case cold water is desired valve 17 is opened and the water is permitted to enter passage way 26 and is discharged therefrom through the discharge 27. In case it is desired to heat the water, valve 18 is opened and the water passes through the passage way 28 and pipe 29 is discharged near the bottom of heating tube 33 and is heated thereby and passes thence through port 42 and passage way 26 to discharge 27.

A detachable hinged member 43 is provided which embraces the casing 1 of the heater as shown in Fig. 2, and is designed for the purpose of securing the device to the chair to which it is to be attached and the heater and filter casings are preferably of the same size in order that the hinged member may be secured to either as may be desired.

What I claim is:—

1. A device of the character described including a heater casing and a filter casing; a filter within said filter casing; a heater within said heater casing; a fluid inlet to the filter casing; a bridge member connecting said casings; a double passage way within said bridge member whereby fluid may be conducted from the filter casing through said heater casing and thence to a discharge outlet and also through which fluid may be conducted from said filter casing directly to said discharge.

2. A device of the character described including a heater casing and a filter casing; a filter within said filter casing; a heater within said heater casing; a fluid inlet to said filter casing; a bridge member connecting the filter casing and the heater casing said member being provided with a double passage way, the passage way being so arranged as to conduct the fluid from the filter casing through the heater casing and thence to a discharge and also to conduct the fluid from the filter casing to said discharge direct, and a means for controlling the flow of fluid through said passage ways.

3. In a device of the character described the combination with a detachable supporting means of a combined heating and filtering device including a filter casing and a heater casing; a filter carried by the filter casing; a heater carried by the heater casing; a fluid inlet for said filter casing; a bridge member connecting said casing, said member being provided with a plurality of liquid conduits uniting in a common discharge one of which conducts the fluid from said filter through said heater and thence to the discharge and the other of which conducts the fluid from said filter to said discharge direct, and means for controlling the flow of fluid through the conduits.

4. In a device of the character described a combined heating and filtering device including a filter casing and a heater casing; a filter carried by the filter casing; a heater carried by the heater casing; a fluid inlet for said filter casing; a bridge member connecting said casings, said member being provided with a plurality of liquid conduits uniting in a common discharge one of which conducts the fluid from said filter through said heater and thence to the discharge and the other of which conducts the fluid from said filter to said discharge direct, and means for controlling the flow of fluid through the conduits.

5. In a device of the character described the combination with a filter provided with a fluid inlet and outlet, of a heater; a bridge member connecting said filter and heater; a means carried by the heater for heating the contents thereof; said bridge member being provided with a fluid conduit for leading the fluid from the filter through the bridge member to the heater; an outlet conduit through said bridge member for said heater; a fluid conduit for leading the fluid from said filter through said bridge member to said outlet, and means for controlling the flow of fluid through said conduits.

In testimony whereof I have hereunto set my hand.

OLYMPIO F. GAMBATI.

In the presence of—
H. S. BARKER,
M. EMERY.